(12) United States Patent
Cannon et al.

(10) Patent No.: US 7,162,027 B1
(45) Date of Patent: Jan. 9, 2007

(54) VOICE MESSAGING SYSTEM CALLER RING BYPASS CONTROL

(75) Inventors: Joseph M. Cannon, Harleysville, PA (US); James A. Johanson, Macungie, PA (US); Doreen M. Micheletti, Zionsville, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/190,129

(22) Filed: Nov. 12, 1998

(51) Int. Cl.
 *H04M 1/64* (2006.01)
(52) U.S. Cl. .................................. 379/382; 379/373.01
(58) Field of Classification Search ............. 379/90.01, 379/93.28, 373.01, 375, 88.18, 88.23, 88.24, 379/88.25, 88.26, 88.07, 88.08, 88.11, 88.22, 379/67.1, 376.02, 382, 179, 181, 372, 77
 See application file for complete search history.

(56) References Cited

U.S. PATENT DOCUMENTS

| | | | | |
|---|---|---|---|---|
| 4,387,272 A | * | 6/1983 | Castro et al. ................. | 379/77 |
| 5,155,760 A | * | 10/1992 | Johnson et al. ............. | 370/428 |
| 5,655,011 A | * | 8/1997 | Brown .................... | 379/93.06 |
| 5,657,379 A | * | 8/1997 | Honda et al. ............ | 379/93.28 |
| 5,894,505 A | * | 4/1999 | Koyama .................... | 379/67.1 |
| 5,905,794 A | * | 5/1999 | Gunn et al. ............ | 379/142.01 |
| 5,909,488 A | * | 6/1999 | Koizumi et al. ....... | 379/376.02 |
| 5,930,338 A | * | 7/1999 | McKendry et al. .... | 379/142.07 |
| 5,987,120 A | * | 11/1999 | Hwang et al. ............... | 379/382 |
| 6,044,148 A | * | 3/2000 | Bleile .......................... | 379/372 |
| 6,064,874 A | * | 5/2000 | Cox et al. ................ | 379/88.13 |
| 6,128,382 A | * | 10/2000 | Borland et al. ........ | 379/373.01 |
| 6,215,857 B1 | * | 4/2001 | Kasiviswanathan ........ | 379/67.1 |
| 2002/0051528 A1 | * | 5/2002 | Shepherd | |

\* cited by examiner

*Primary Examiner*—Gerald Gauthier (57) ABSTRACT

A voice messaging system such as a telephone answering device which allows a calling party to bypass the ring signal and substantially immediately allow the calling party to leave a voice message. To activate the no ring signal access to the telephone answering device, the calling party preferably enters a control sequence prior to entering the telephone number of the called party to signal the appropriate central office to signal the telephone line of the called party that the ring signal is to be bypassed. The central office includes an appropriate ring signal bypass request detection module adapted to detect a request for no ring signal from a calling party. In the disclosed embodiment, the calling party signals the central office using an appropriate sequence of DTMF tones, e.g., '*77', and the central office in turn signals the telephone line using a non-ring signal, e.g., a line reversal. If the called party's telephone remains on-hook after a predetermined amount of time after the central office has signaled a no ring signal request, e.g., DirectAnswer™ signaling using a line reversal and appropriate DTMF tones as desired, the central office may proceed to send ring signals on the telephone line to the called party for functionality in a conventional sense.

14 Claims, 5 Drawing Sheets

VOICE MESSAGING SYSTEM CALLER RING BYPASS CONTROL

BACKGROUND OF THE INVENTION

1. Field of the Invention

This invention relates generally to a voice messaging system which is capable of recording an incoming voice message from a calling party. More particularly, it relates to a voice messaging system which allows a caller to bypass the necessity of an incoming call ring signal to the voice messaging system of a called party and instead proceed directly to either the playing of an outgoing greeting message or directly to the recording of a message.

2. Background of Related Art

Voice messaging systems (e.g., telephone answering devices) are useful devices for the home or small office. A conventional telephone answering device operates on a single telephone line and answers an incoming call to an unused (i.e., on-hook) telephone after a desired number of rings. Typically the number of rings may be set, e.g., to allow automatic pickup of the telephone call after two (2) rings, after four (4) rings, after eight (8) rings, etc.

After the desired number of rings, a telephone line interface in the telephone answering device places the telephone line in an off-hook condition, then plays an outgoing greeting message to the caller. After the outgoing greeting message is completed, the calling party is finally allowed to record a voice message in voice message memory of the telephone answering device. The user of the telephone answering device may replay the recorded voice message at a later time.

Figure 5:
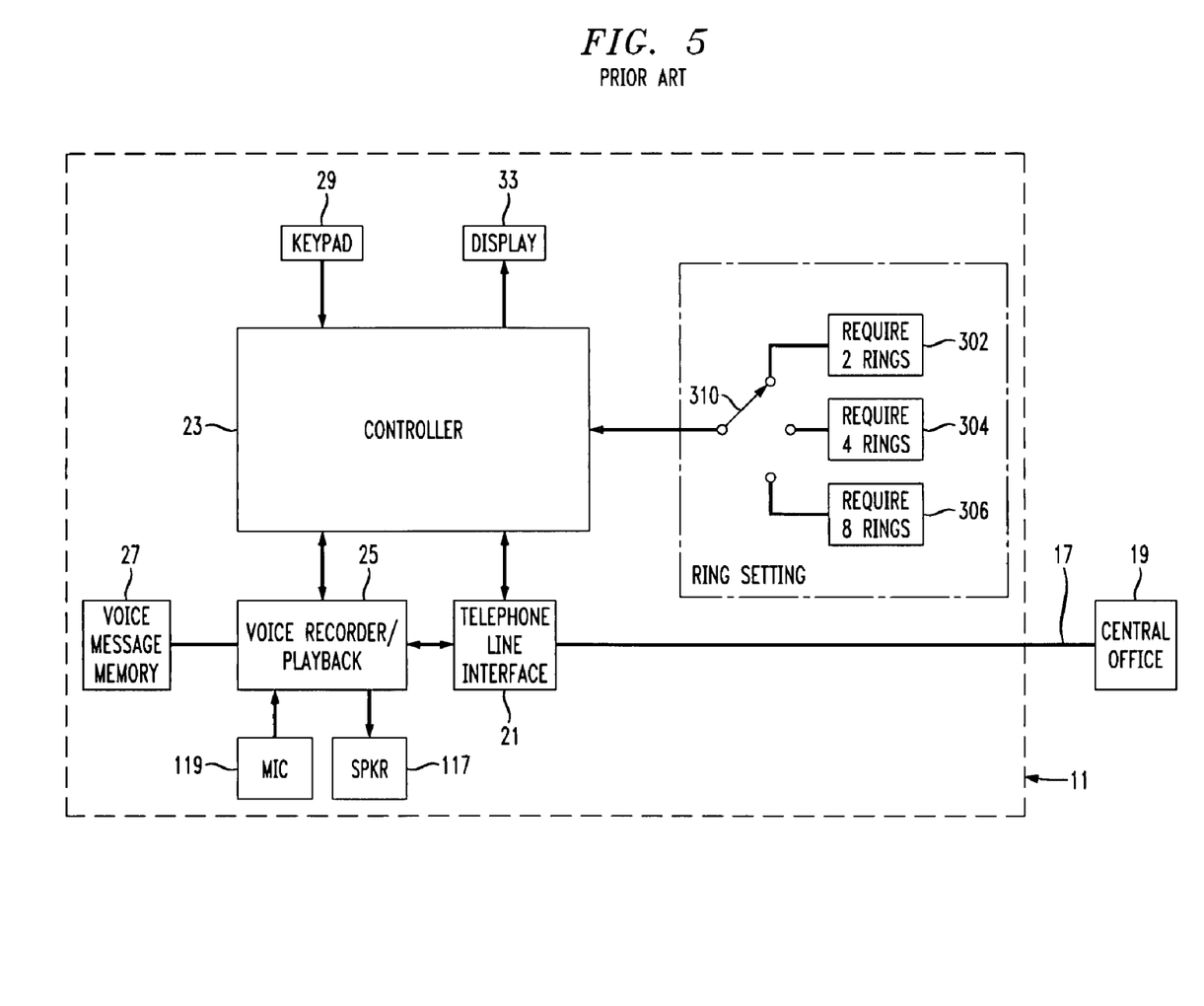
FIG. 5 illustrates a conventional telephone answering device operating on a single telephone line.

FIG. 5 illustrates an exemplary conventional telephone answering device 11 capable of answering an incoming call on a telephone line 17 after a predetermined number of rings.

In particular, in FIG. 5, a telephone answering device 11 is connected to a telephone company central office 19 via a telephone line 17. A telephone line interface (TLI) 21 in the telephone answering device 11 interfaces with the telephone line 17.

The telephone answering device 11 further includes a controller 23, an alphanumeric keypad 29, a display 33 for showing the operations of the controller 23 and/or for displaying call related information if available in the telephone answering device 11.

The alphanumeric keypad 29 allows a user to select any function of the various conventional modes of operation, including the playback of voice messages stored in the telephone answering device 11.

A voice recorder/playback module 25 including a speaker 117 and a microphone 119 allow recording and playback of voice messages to and from voice message memory 27. The voice message memory 27 is preferably a suitable non-volatile memory, e.g., Flash memory.

The controller 23 can be any suitable processor, e.g., microprocessor, microcontroller, or digital signal processor (DSP), and controls the general operation of the telephone answering device 11.

The telephone line interface 21 provides the conventional isolation, DC and AC impedance, as required by typical telephone company standards. The telephone line interface 21 also provides a ring detect signal to the controller 23 based on the detection of an incoming ring signal on the telephone line 17.

The ring detect signal indicates ring signals received on the telephone line 17 to the controller 23. A ring setting switch 310 or similarly functioning device sets the required number of ring signals the telephone answering device 11 receives over the telephone line 17 before the telephone answering device will instruct the telephone line interface 21 to place the telephone line 17 in an off-hook condition. Preferably, the ring setting switch 310 will have a plurality of settings, e.g., requiring two (2) rings 302, requiring four (4) rings 304, or requiring eight (8) rings 306.

After a desired number of ring signals are detected by the controller 24, the telephone line interface 21 is caused to place the telephone line in an off-hook state. With the telephone line 17 in an off-hook condition, the controller 23 instructs the voice recorder/playback audio module 25 to play a pre-recorded outgoing greeting message stored in the voice message memory 27 to the calling party over the telephone line 17. Upon completion of the playback of the outgoing greeting message, the calling party is then finally allowed to record a voice message in the voice message memory 27 under the control of controller 23.

In some instances, the calling party may be aware or believe that the called party is not available, or may not want to bother the called party for a minor message. Instead, the calling party might only desire to record a voice message on the telephone answering device of the called party for playback at the called party's convenience. This may also be the case in a business setting where a receptionist or an office assistant answers the telephone for the called party. The caller may wish to simply record a message in the called party's voice messaging system instead of speaking with the receptionist. This technique may waste the caller's time by requiring the caller to explain to the receptionist the purpose of the call, and eventually allow the caller to record a voice message in the called party's voice messaging system anyway.

In any event, the number of ring signals required by a voice messaging system, or the use of a receptionist or office assistant, are conventionally under the control of the called party using the voice messaging system. Thus, the caller must conventionally wait through as many rings signals as are required by a called voice messaging system, or must speak with a receptionist, whether they want to or not. This may often result in wasted time on the part of the calling party.

Accordingly, there exists a need for a voice messaging system, e.g., a telephone answering device, which allows the calling party sufficient control to instruct the called voice messaging system to bypass a default ring signal setting and go either directly to the playback of an outgoing greeting message, or directly to recording a voice message.

SUMMARY OF THE INVENTION

In accordance with the principles of the present invention, a voice messaging system comprises a telephone line interface, a voice recorder/playback module, and a controller adapted to control functions of said voice messaging system. A ring signal bypass module is adapted to detect a presence of a non-ring signal indicating a presence of an incoming call, and to cause the telephone line interface to place a telephone line in an off-hook condition before reception of an initial ring signal relating to the incoming call.

A method of allowing bypass of a ring signal in a voice messaging system in accordance with another aspect of the present invention comprises receiving a non-ring signal indicating a presence of an incoming call to the voice messaging system. The incoming call is answered by the voice messaging system before a reception of any ring signal.

A method of allowing a calling party to bypass a ring signal in a voice messaging system of a called party, the voice messaging system including voice message memory for recording a voice message, in accordance with another aspect of the present invention comprises providing a ring signal bypass module in the voice messaging system. The ring signal bypass module is activated based on a request from the calling party. All ring signals to the voice messaging system are bypassed by answering a call from the calling party before a reception of any ring signal.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a voice messaging system that has added control over its ring circuitry such that a central office can signal the voice messaging system to establish that no ring signaling should occur. Instead, the voice messaging system will either substantially immediately playback the outgoing greeting message to the caller and then allow the caller to record a voice message, or allow the caller to record a voice message without playback of the outgoing greeting message.

This 'no ring' signaling from the central office is referred to herein as a DirectAnswer service. DirectAnswer signaling service allows a caller to control a called party's voice messaging system to the extent that a ring signal can be avoided and a recording process will be initiated substantially immediately, without ringing.

The disclosed embodiments relate specifically to a telephone answering device which allows a calling party to record a voice message without first requiring a ring signal. However, the principles of the present invention relate equally to voice messaging systems in general, e.g., to a voice mail system typically associated with a private branch exchange (PBX) often found in businesses.

Figure 1:
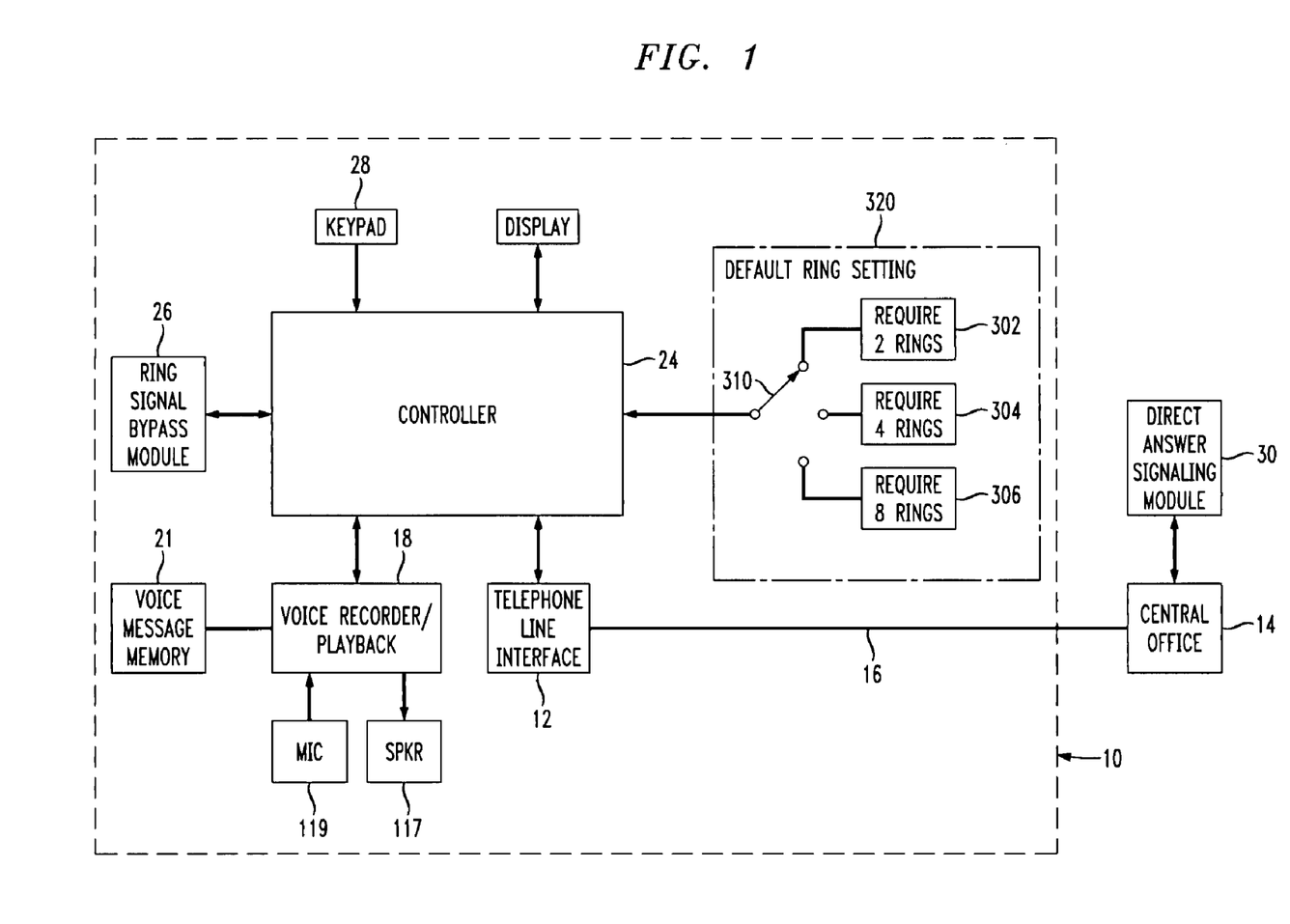
FIG. 1 illustrates a telephone answering device constructed in accordance with the principles of the present invention to allow a caller to bypass an incoming telephone ring signal and/or playing of an outgoing greeting message to allow direct recording of a voice message.

FIG. 1 illustrates a telephone answering device, indicated generally at 10, capable of allowing a calling party to bypass the requirement for a predetermined or default number of telephone ring signals before automatically recording a voice message of the calling party, in accordance with the principles of the present invention.

In the embodiment of FIG. 1, the telephone answering device 10 includes a telephone line interface (TLI) 12 for interconnection with a central office 14 via a telephone line 16. The telephone answering device 10 further includes a controller 24, a default ring setting module 320, and a voice recorder/playback module 18. The controller 24 can be any suitable processor, e.g., microprocessor, microcontroller, or digital signal processor (DSP).

The voice recorder/playback module 18 includes a speaker 117 for playback of recorded voice messages, a microphone 119 for recording a custom outgoing greeting message, and voice message memory 21, each otherwise as in a conventional telephone answering device, e.g., as shown in FIG. 5.

The telephone line interface 12 provides the conventional isolation, DC and AC impedance, as required by typical telephone company standards. Moreover, in accordance with the principles of the present invention, the telephone line interface 12 is capable of receiving non-ring type signaling indicating the presence of an incoming call. For instance, in the disclosed embodiment, the telephone line interface is capable of detecting a line reversal invoked by the central office 14.

For conventional operation, the telephone line interface 12 also provides a ring detect signal to the controller 24 based on the detection of an incoming ring signal on the telephone line 16. A ring setting switch 310 or similarly functioning device sets the required number of ring signals the telephone answering device 10 receives over the telephone line 16 before the telephone answering device 10 will instruct the telephone line interface 12 to place the telephone line 16 in an off-hook condition.

Importantly, the exemplary embodiment of a telephone answering device 10 as shown and described with reference to FIG. 1 further includes a ring signal bypass module 26.

The ring signal bypass module 26 is preferably a software module operating within the program code of the controller 24. However, it is within the principles of the present invention to implement the ring signal bypass module 26 separate from the controller 24. In any event, the ring signal bypass module 26 is in communication with the telephone line interface 12 and/or the controller 24.

In addition to conventional operation, the telephone answering device 10 in accordance with the principles of the present invention allows a calling party to signal a central office 14 to not ring the called party, which in turn signals the telephone answering device 10 of the called party, e.g., using DirectAnswer, to instruct that no ring signals should occur before a recording process begins.

Accordingly, in operation, the ring signal bypass module 26 receives an indication from the telephone line interface 12 of the occurrence of DirectAnswer signaling from the central office 14. The DirectAnswer signaling from the central office 14 is initiated by the caller using any appropriate signaling, e.g., by input of a special code using an alphanumeric keypad at the calling party's telephone.

A calling party may signal a central office 14 for DirectAnswer service to occur in any appropriate way. For instance, the calling party may dial a predetermined code either before or after the digits of the called party are dialed. In one disclosed embodiment, the predetermined code to be dialed on an alphanumeric keypad by a calling party is "*77", which is dialed before the digits of a telephone number. Of course, the present invention relates equally to any particular code and/or any particular timing for entering the code from the calling party's telephone. Accordingly, the ring signal bypass module 26 provides the calling party with control over the telephone answering device 10 of the called party such that the ring signal of the telephone answering device 10 can be bypassed and a voice message can be substantially immediately recorded by the calling party.

In response to the request from the calling party for DirectAnswer service to be signaled to the called party, the central office 14 will appropriately signal the called party's telephone line 16, e.g., with a 'line reversal' to the called party's telephone line, an FSK transmission, or a special ring cadence.

If the called party's voice messaging system has DirectAnswer capability, then the telephone line interface 12 will detect the line reversal, FSK transmission, or special ring cadence from the central office and interpret the same as signaling to substantially immediately place the telephone line 16 in an off-hook condition and enter a recording phase. Depending upon a mode established in the controller 24 of the telephone answering device 10, either an outgoing greeting message will be played and then the calling party will be allowed to record a voice message, or the calling party will be allowed to record a voice message with or without playback of the outgoing greeting message.

An appropriate signaling module, e.g., a DirectAnswer signaling module 30 at the central office 14 determines the existence of a request from a calling party for DirectAnswer service to be signaled to a called party. The DirectAnswer signaling module 30 also signals the appropriate line card in the central office 14 to provide the appropriate signaling to the telephone line 16, e.g., a line reversal, FSK transmission, or special ring cadence.

As in conventional telephone answering devices, the ring select switch 310 and associated ring settings 302–306 in the telephone answering device 10 establish a default ring setting which will occur unless the caller instructs the telephone answering device 10 to bypass an incoming ring signal and take the telephone line 16 off-hook. Thus, if the called party does not have a telephone answering device capable of bypassing a ring signal, e.g., using DirectAnswer service, then the telephone answering device which the user does have connected to the telephone line 16 will function in a conventional fashion, e.g., requiring a predetermined number of ring signals to occur before the telephone line 16 will be taken off-hook.

The telephone answering device 10 can be set to either play an outgoing greeting message upon receipt of DirectAnswer signaling from the DirectAnswer signaling module 30 of the central office 14, or to skip playback of the outgoing greeting message and instead go directly to recording a voice message. If the telephone answering device 10 is set to skip playback of the outgoing greeting message, preferably a short beep or other tone will be played over the telephone line 16 to the calling party to indicate a beginning of a recording process by the voice recorder/playback module 18.

In operation of the disclosed embodiment of a telephone answering device 10 in accordance with the principles of the present invention, a calling party may desire to make a quick telephone call either without waiting for all ring signals to occur before leaving a voice message, or without speaking to an answering service or receptionist. In such a case, the calling party may initiate an appropriate control sequence to designate a telephone call as one which is to bypass the ring signal of a telephone answering device 10 at the called party's telephone line. For example, the calling party may initiate an appropriate control sequence by inputting "*77" or other predefined code into an alphanumeric keypad for translation into appropriate dual tone, multiple frequency (DTMF) touch tones to the central office. Once the calling party initiates the requesting control sequence, an appropriate bypass control module such as a DirectAnswer signaling module 30 associated with the telephone company central office 14 will recognize the control sequence and pass that information along with the dialed telephone number to the central office servicing the called party.

The appropriate line card in the telephone switch at the central office servicing the called party will signal the telephone line of the called party with an appropriate non-ring signal, e.g., by reversing the polarity of the telephone line. If the called party has a telephone answering device 10 in accordance with the principles of the present invention, e.g., including a ring signal bypass module 26, the telephone answering device 10 will immediately go off-hook and either play the outgoing greeting message and allow the calling party to record a voice message, or simply place a beep or short tone signal on the telephone line 16 and allow immediate recording of a voice message from the calling party, depending upon the pre-set mode of the ring signal bypass module 26 in the telephone answering device 10 established by its user.

If the telephone answering device 10 is not equipped with a ring signal bypass module 26 or a control sequence is not initiated by the calling party prior to the calling party dialing the telephone number, the telephone call is handled as a normal telephone call in which the telephone answering device 10 will detect a predetermined number of ring signals before answering the telephone call.

If the called party's telephone remains on-hook after a predetermined amount of time after the central office has signaled a no ring signal request, e.g., DirectAnswer signaling using a line reversal and/or appropriate DTMF tones as desired, the central office may proceed to send ring signals on the telephone line to the called party for functionality in a conventional sense.

For countries which currently use a line reversal for other services, additional signaling can be combined to create a 'no ring signal' request. For instance, the central office can transmit a line reversal followed by an appropriate DTMF bypass indicator tone (or predetermined sequence of tones) to differentiate the ring signal bypass feature from other offered services.

Figure 2:
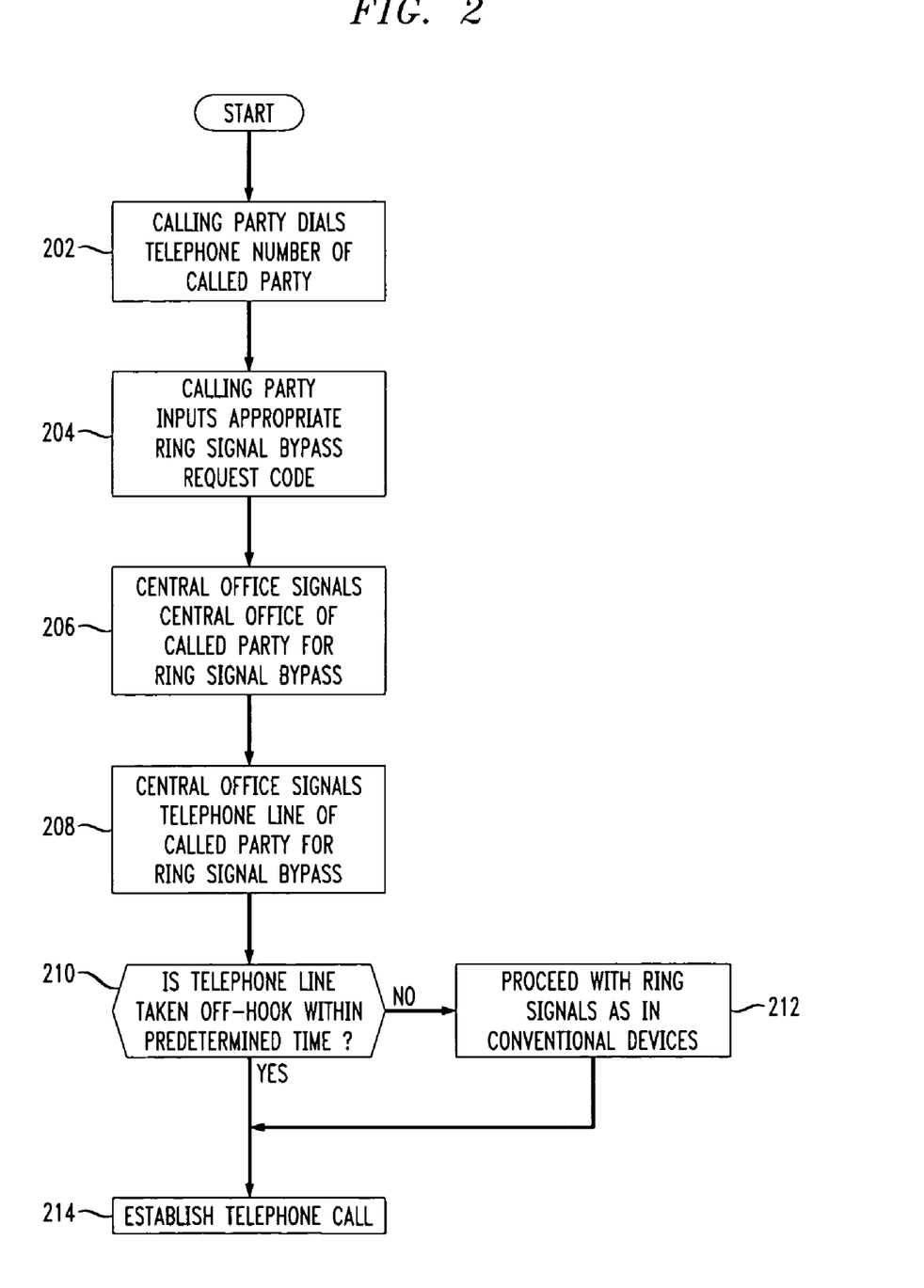
FIG. 2 is a flow chart illustrating the process by which a voice messaging system constructed in accordance with the principles of the present invention, e.g., as shown in FIG. 1, allows a caller to bypass the incoming telephone ring signal and/or playing of an outgoing greeting message to allow direct recording of a voice message.

FIG. 2 illustrates a flow chart showing an exemplary process by which a telephone answering device 10 in accordance with the principles of the present invention allows a calling party to bypass the ring signal of a called party's telephone answering device 10.

In step 202, the calling party dials the appropriate telephone number of the called party.

In particular, in step 204 of FIG. 5, the calling party enters the appropriate ring signal bypass request code, e.g., "*77", using an off-hook telephone in communication with a central office. In an alternative embodiment, step 202 may be performed after step 204, i.e., the ring signal bypass request code may be entered before the telephone number of the called party.

In step 206, the central office servicing the calling party sends an appropriate data message to the central office of the called party requesting ring signal bypass for the incoming telephone call.

In step 208, the central office servicing the called party signals the telephone line of the called party using a non-ring signal, e.g., using line reversal by the appropriate line card.

In step 210, if the telephone line of the called party responds to the non-ring signal from the central office by taking its telephone answering device off-hook, the telephone call will be established in an otherwise conventional fashion but without the use of a ring signal to the called party, e.g., as shown in step 214. However, if the telephone line of the called party is not taken off hook within a reasonable amount of time, e.g., within a couple seconds, the central office will proceed to provide ring signals to the telephone line of the called party, as shown in step 212, and the telephone call will be established in otherwise conventional fashion as shown in step 214.

Figure 3:
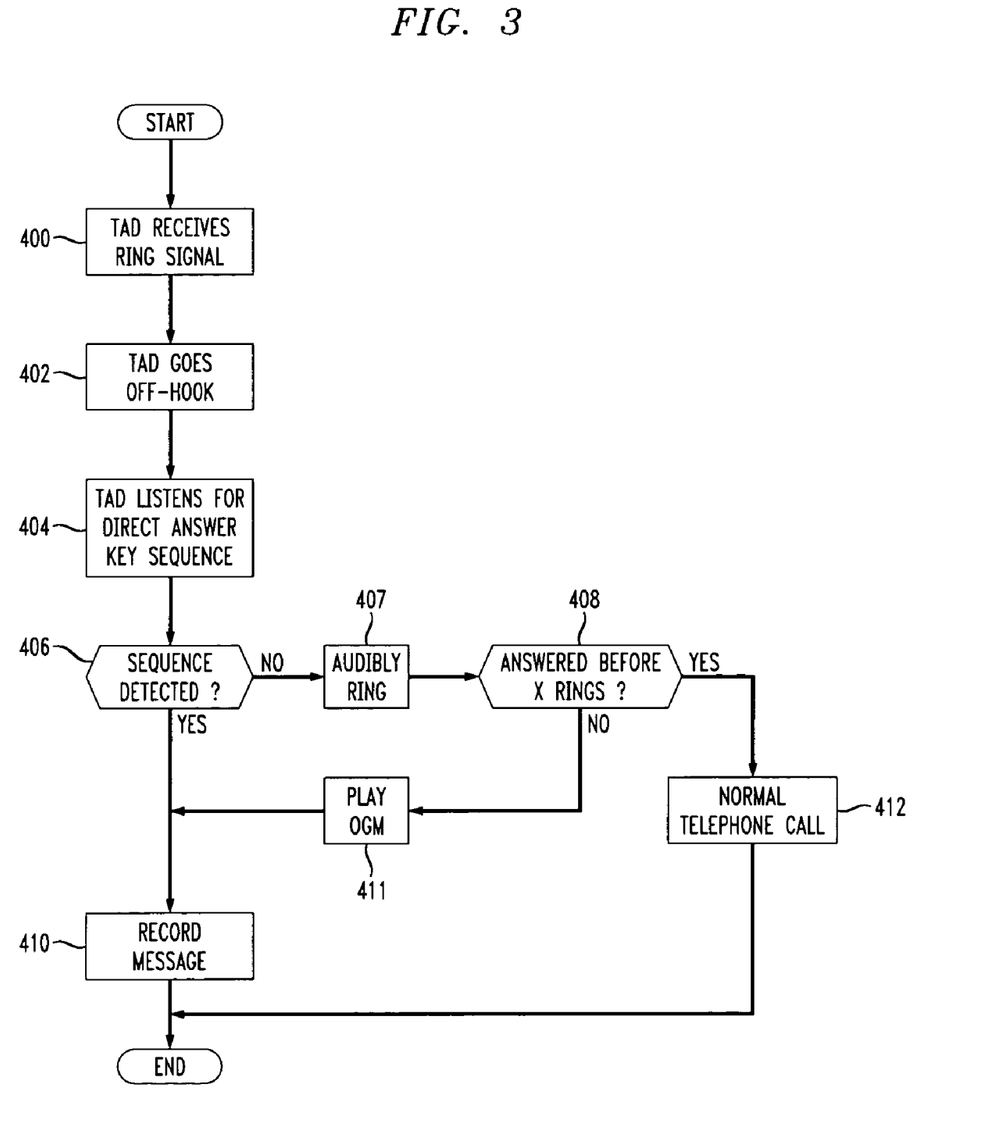
FIG. 3 illustrates an exemplary process at a customer premises equipment including ring bypass features, e.g., as shown in FIG. 1.

An alternative embodiment is shown in FIG. 3.

In particular, in FIG. 3, instead of utilizing a non-ring signal from a central office as in the embodiment shown in FIG. 2, the caller may dial a telephone as usual and, after the called telephone answering device goes off hook, enter a predetermined code to instruct the telephone answering device to enter a direct record mode.

For instance, in step 400 of FIG. 3, the telephone answering device receives a ring signal relating to an incoming call.

In step 402, the telephone answering device goes off-hook, e.g., after receipt of the first ring signal.

In step 404, the telephone answering device listens for the predetermined code sequence indicating the desirability for direct message recording.

In step 406, a decision is made as to whether or not the predetermined code sequence was input by the caller within a predetermined amount of time, e.g., within 4 seconds. If it wasn't, then the telephone answering device provides a predetermined number of audible rings as shown in step 407. If the telephone answering device is answered before the predetermined number of rings as shown in step 408, then a normal telephone call would proceed as shown in step 412. If, on the other hand, the telephone answering device is not answered before the predetermined number of rings, then an outgoing greeting message would be played to the caller as shown in step 411, and a voice message would be recorded as shown in step 410.

If, on the other hand, the predetermined sequence was detected in step 406, the telephone answering device would directly allow recording of a voice message as shown in step 410.

Thus, the called telephone would detect, e.g., the first incoming ring signal, go off-hook, and wait for the input by the caller of a particular predetermined key sequence, e.g., "77". If the predetermined key sequence is not detected by the called telephone, the telephone answering device would output an audible ring for the preset number of rings, then operate in an otherwise conventional fashion, e.g., by playing an outgoing greeting message and recording a voice message. However, if the predetermined key sequence is detected, the called telephone answering device would go directly into the voice message record mode.

Figure 4:
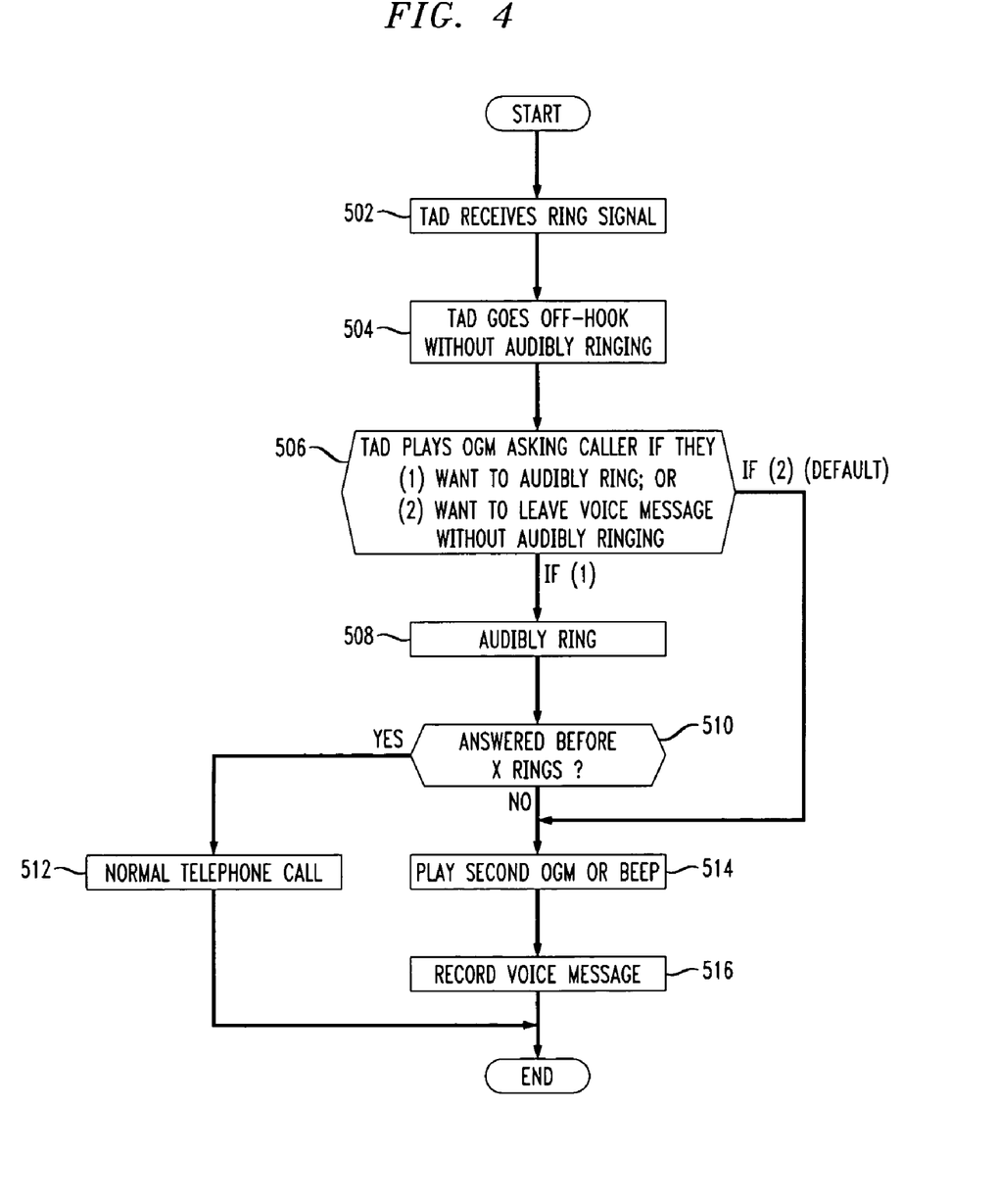
FIG. 4 illustrates another exemplary process whereby the principles of the present invention are implemented at the called party's customer premises equipment.

The present invention can also be implemented only at the called party's customer premises equipment, as shown in the exemplary process of FIG. 4.

In particular, a telephone answering device constructed in accordance with the principles of the present invention receives a ring signal from a central office on a telephone line as shown in step 502.

In step 504, the telephone answering device goes off-hook without audibly ringing, e.g., after receipt of the first ring signal on the telephone line.

In step 506, still preferably without notifying the called party of the presence of an incoming call, the telephone answering device plays an initial outgoing greeting message to the caller. This initial greeting message may have any content, but preferably informs the calling party of a choice to be made. The caller may either choose to audibly ring the telephone answering device in the hopes that someone will answer the telephone, or may choose to bypass the audible rings to the called party and directly record a voice message. Preferably, if the calling party does not choose an option within a reasonable amount of time, e.g., within 5 seconds, a default choice will be presumed. Preferably, the default setting may be preset by the user to either position (1), i.e., audible ring); or (2), i.e., no audible ring.

In particular, in response to step 506, the calling party may select (1), either by choice or by default. The choice may be made, e.g., by depressing a particular key on the telephone keypad which is then decoded by the controller 24 of the telephone answering device 10, then the telephone answering device 10 will audibly ring up to a predetermined number of times as shown in step 508. If the telephone answering device is answered before the predetermined number of rings as shown in step 510, then a normal telephone call would proceed as shown in step 512. If, on the other hand, the telephone answering device is not answered before the predetermined number of rings, then an outgoing greeting message would be played to the caller as shown in step 514, and a voice message would be recorded as shown in step 516.

If the calling party selects the option, either by choice or by default, to directly record a voice message without audibly ringing the telephone answering device, then the process will proceed directly to step 514 (or step 516 depending upon the application) and thus bypass the audible ring signal.

While the invention has been described with reference to the exemplary embodiments thereof, those skilled in the art will be able to make various modifications to the described embodiments of the invention without departing from the true spirit and scope of the invention.

What is claimed is:

1. A voice messaging system, comprising:
   an analog telephone line interface;
   a voice recorder/playback module;
   a controller adapted to control functions of said voice messaging system; and
   a ring signal bypass module adapted to detect a presence of an analog non-ring signal initiated by a caller without prompt utilizing said analog telephone line interface indicating a presence of an incoming call, and to cause said voice messaging system to direct said incoming call to said voice recorder/playback module without an audible ring signal to announce said incoming call by said voice messaging system and to bypass an outgoing greeting message associated with a called party.

2. The voice messaging system according to claim 1, wherein:
   said analog telephone line interface is adapted to detect a line reversal on said telephone line.

3. The voice messaging system according to claim 1, wherein:
   said voice messaging system is a telephone answering device.

4. A method of allowing bypass of a ring signal in a voice messaging system, comprising:
   receiving an analog non-ring signal initiated by a caller without prompt at an analog telephone line interface indicating a presence of an incoming call to said voice messaging system; and answering said incoming call by said voice messaging system without an audible ring signal to announce said incoming call by said voice messaging system; and bypassing an outgoing greeting message associated with a called party.

5. The method of allowing bypass of a ring signal in a voice messaging system according to claim 4, wherein said answering comprises:

playing an outgoing greeting message to a caller associated with said incoming call without requiring reception of any ring signal relating to said incoming call; and allowing said caller to record a voice message.

6. The method of allowing bypass of a ring signal in a voice messaging system according to claim 4, wherein said answering comprises:

allowing a caller associated with said incoming call to record a voice message without requiring reception of any ring signal relating to said incoming call.

7. Apparatus for allowing bypass of a ring signal in a voice messaging system, comprising:

means for receiving an analog non-ring signal initiated by a caller at an analog telephone line interface indicating a presence of an incoming call to said voice messaging system; and means for answering said incoming call by said voice messaging system without an audible ring signal to announce said incoming call by said voice messaging system; and means for bypassing an outgoing greeting message associated with a called party.

8. The apparatus for allowing bypass of a ring signal in a voice messaging system according to claim 7, wherein said means for answering comprises:

means for playing an outgoing greeting message to a caller associated with said incoming call without requiring reception of any ring signal relating to said incoming call; and means for allowing said caller to record a voice message.

9. The apparatus for allowing bypass of a ring signal in a voice messaging system according to claim 7, wherein said means for answering comprises:

means for allowing a caller associated with said incoming call to record a voice message without requiring reception of any ring signal relating to said incoming call.

10. The apparatus for allowing bypass of a ring signal in a voice messaging system according to claim 7, further comprising:

means for inputting a request for a transmission of said analog non-ring signal from a calling party's telephone.

11. A method of allowing a calling party to bypass a ring signal in a voice messaging system of a called party, said voice messaging system including voice message memory for recording a voice message, the method comprising:

providing an analog ring signal bypass module in said voice messaging system;

activating said analog ring signal bypass module based on a request from said calling party without prompt from said voice messaging system; and bypassing an audible ring signal by said voice messaging system announcing an incoming call from said calling party to said voice messaging system; and bypassing an outgoing greeting message associated with a called party.

12. The method of allowing a calling party to bypass a ring signal in a voice messaging system of a called party according to claim 11, further comprising:

allowing said calling party to record a voice message in said voice message memory before reception of any analog ring signal.

13. The method of allowing a calling party to bypass a ring signal in a voice messaging system of a called party according to claim 11, further comprising:

entering a request for performance of said step of bypassing all analog ring signals by said calling party.

14. The method of allowing a calling party to bypass a ring signal in a voice messaging system of a called party according to claim 11, wherein:

said request is entered by said calling party before a telephone number of said called party is dialed by said calling party.

* * * * *